United States Patent [19]

McGarr

[11] 4,400,975
[45] Aug. 30, 1983

[54] APPARATUS FOR MONITORING LIQUID FLOW RATES

[75] Inventor: John W. McGarr, Griffith, Ind.

[73] Assignee: Atlantic Richfield Company, Philadelphia, Pa.

[21] Appl. No.: 267,498

[22] Filed: May 27, 1981

[51] Int. Cl.³ .............................................. G01F 1/68
[52] U.S. Cl. .................................................. 73/204
[58] Field of Search ........................................ 73/204

[56] References Cited

U.S. PATENT DOCUMENTS

| | | | |
|---|---|---|---|
| 2,525,197 | 10/1950 | Beams et al. | 73/204 |
| 2,813,237 | 11/1957 | Fluegel et al. | 73/204 X |
| 3,326,040 | 6/1967 | Walsh | 73/204 |

*Primary Examiner*—Herbert Goldstein

*Attorney, Agent, or Firm*—Frank J. Uxa

[57] ABSTRACT

An apparatus adapted to monitor the flow rate of a liquid comprising a conduit through which the liquid is caused to flow; a heater adapted to supply heat at a substantially constant rate to the liquid in the conduit; a temperature control device adapted to maintain the area outside of and adjacent to the conduit at substantially the same temperature as the liquid entering the conduit; and upstream and downstream temperature sensors to sense the temperature of the liquid in the conduit upstream and downstream, respectively, of the place at which the heat is supplied to the liquid, whereby the difference in temperatures sensed by the upstream and downstream temperature sensors is proportional to the flow rate of the liquid in the conduit.

9 Claims, 1 Drawing Figure

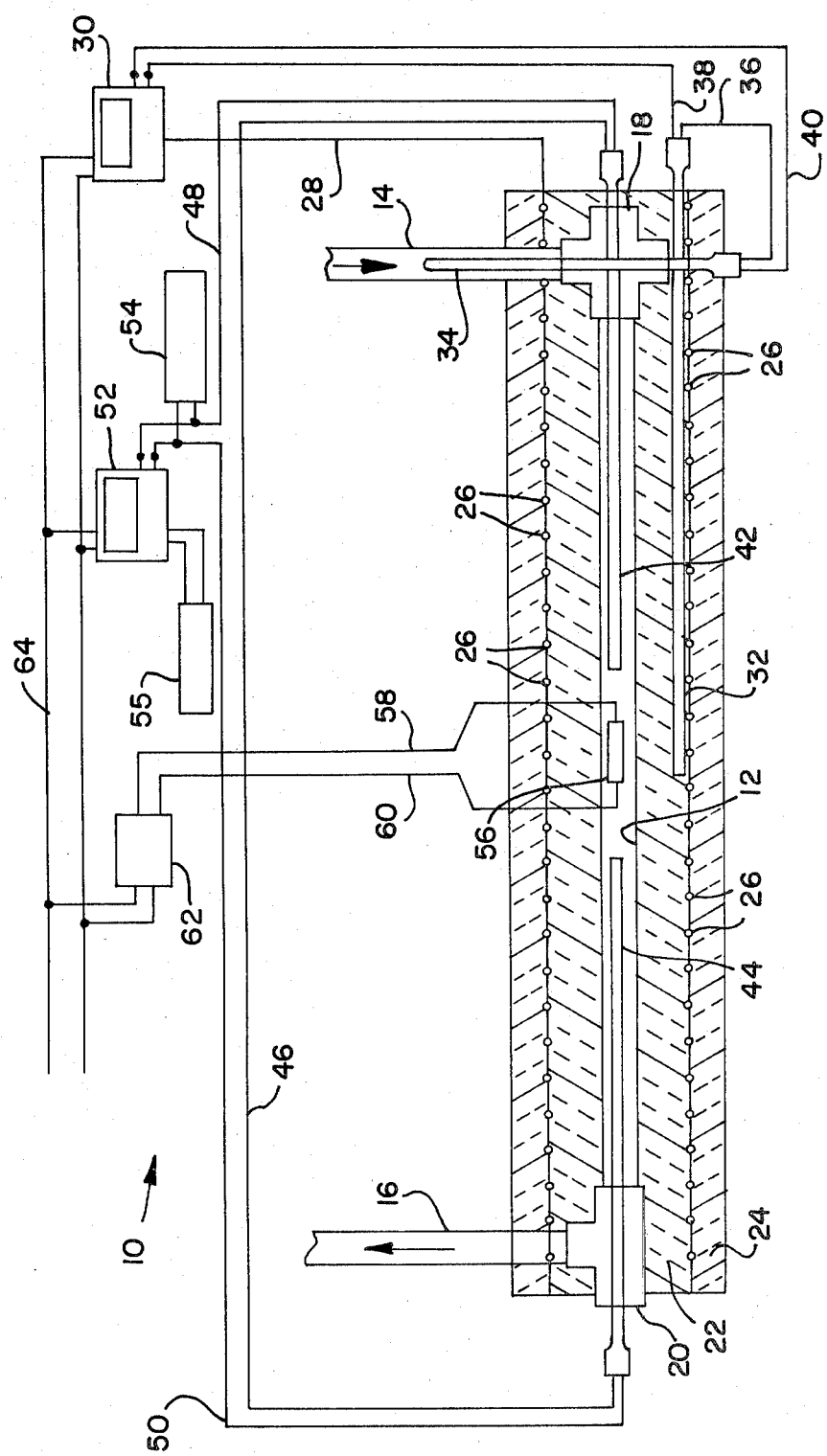

APPARATUS FOR MONITORING LIQUID FLOW RATES

This invention relates to an apparatus useful for monitoring (or measuring) the flow rate of a liquid stream. More particularly, the invention relates to an improved apparatus useful to monitor (or measure) the flow rates of liquid streams flowing at relatively slow rates.

A great many prior art devices have been suggested to measure liquid flow rates. However, in many instances, these devices become relatively inaccurate and/or provide non-reproducible results or measurements as the flow rate of the liquid is reduced to relatively slow or low rates. Liquid flow rates in the range of about 30 grams per hour to about 600 grams per hour are particularly difficult to measure or monitor. Such liquid flow rates are important because, for example, often laboratory and/or pilot plant experiments involve such quantities of material and the accuracy of the experiment itself is dependent on the accuracy of the liquid flow rate measurement. Clearly, a simple, yet effective, means for measuring (or monitoring) liquid flow rates, in particular relatively slow or low liquid flow rates, is advantageous.

The prior art does describe the Thomas Meter (see: "Industrial Instrument for Measurement and Control," by Thomas J. Rhodes, First Edition, Second Impression-Corrected, McGraw-Hill Book Company, Inc., New York and London (1941) at pages 315–316) for measuring the velocity of a gas in a pipe. This prior art device does not concern itself with measuring liquid flow rates and is not concerned, for example, with the heat loss (and its adverse effect on measurement accuracy) involved with liquids flowing through pipes, in particular the rather substantial relative heat losses involved with liquids flowing at relatively slow or low flow rates.

Therefore, one object of the present invention is to provide an improved apparatus for measuring (or monitoring) liquid flow rates.

Another object of the invention is to provide an improved apparatus for measuring (or monitoring) relatively slow or low liquid flow rates. Other objects and advantages of the present invention will become apparent hereinafter.

An improved apparatus adapted to monitor (or measure) the flow rate of a liquid has now been discovered. This apparatus comprises a conduit means through which the liquid is caused to flow. This conduit means has a liquid inlet through which the liquid enters the conduit means and a liquid outlet through which the liquid exits the conduit means. A heating means associated with the conduit means is provided and is adapted to supply heat at a substantially constant rate to the liquid in the conduit means. A temperature control means associated with the conduit means is also provided. This control means is adapted to maintain the area outside of and adjacent to the conduit means at substantially the same temperature, preferably with about ±5° F. and more preferably with about ±2° F., as the liquid entering the conduit means. An upstream temperature sensing means associated with the conduit means is adapted to sense the temperature of the liquid in the conduit means at a point prior to (upstream from the place where) the heat from the heating means being (is) supplied to the liquid. A downstream temperature sensing means, associated with the conduit means, is adapted to sense the temperature of the liquid in the conduit means at a point after (downstream from the place where) the heat from the heating means is supplied to the liquid. The difference in temperatures sensed by the upstream and downstream sensing means is proportional to the flow rate of the liquid in the conduit means. Thus, by calibrating this temperature difference with liquid flow rate, one can monitor (or measure) such liquid flow rate by determining this temperature difference.

The present apparatus provides substantial advantages. The system has been shown to give accurate and reproducible measurements even at liquid flow rates in the range of about 30 grams per hour to about 600 grams per hour. The apparatus is easy to maintain and reliable. The system can be connected to an alarm system to warn, e.g., by visual and/or audial sign, that the liquid flow rate is abnormally high or low. The temperature control means is particularly important since it has been found that liquid heat loss in the conduit means is significant. Thus, without the temperature control means, the measurements obtained would be inaccurate and/or non-reproducible. The temperature control means effectively counters the heat loss that would otherwise be experienced by the liquid in the conduit means.

In one preferred embodiment, the present apparatus further comprises flow indicator means which is associated with the upstream and downstream temperature sensing means. This flow indicator means is adapted to provide a visual display of the flow rate of the liquid in the conduit means. In another preferred embodiment, the apparatus further includes recorder means associated with both upstream and downstream temperature sensing means. The recorder means is adapted to record the difference in temperature sensed by the two temperature sensing means and, thereby, record—at least indirectly—the flow rate of the liquid in the conduit means over a period of time.

With regard to the heating means, it is preferred that this include at least one electric resistor element, e.g., placed directly within the conduit means, and connected to (i.e., in electrical communication with) a constant voltage means adapted to provide a substantially constant electric potential across the resistor element. In this manner a substantially constant rate of heat is supplied to the liquid in the conduit means. Although any suitable size electric resistor element may be employed, it is preferred that the electric resistor element be in the range of about 20 ohms to about 5,000 ohms. Such electric resistor elements are particularly useful in measuring liquid flow rates in the range of about 30 grams per hour to about 600 grams per hour.

The upstream and downstream temperature sensing means may comprise any suitable temperature measuring device, for example, those which are conventional and well known in the art. It is preferred that each of these temperature sensing means include a thermocouple. Such thermocouples, which are conventionally used to sense temperature, comprise two wires made of different metals that are joined together at the point at which the temperature is to be sensed. Changes in temperature cause a characteristic current to flow in the wires. The amount of current flowing in the wires is proportional to the temperature at the point where the wires are joined together.

The temperature control means of the present apparatus preferably comprises first and second temperature sensing means, each preferably including a thermocouple; temperature maintenance means; and a controller means. The first temperature sensing means is adapted to sense the temperature of the liquid entering the conduit means; while the second temperature sensing means is adapted to sense the temperature of the area outside of and adjacent to the conduit means. The temperature maintenance means is located in spaced relation to the conduit means and is adapted to supply heat to (or remove heat from) the area outside of and adjacent to the conduit means. The controller means, associated with the first and second temperature sensing means and the temperature maintenance means, is adapted to increase or decrease the amount of heat supplied to the temperature maintenance means in response to the difference in temperatures sensed by the first and second temperatures sensing means. In this manner, the temperature control means acts to maintain the area outside of and adjacent to the conduit means at substantially the same temperature as the liquid entering the conduit means.

In an additional preferred embodiment, the temperature control means further comprises a differential temperature indicator means associated with said first and second temperature sensing means and adapted to provide a visual representation of the difference in temperatures sensed by the first and second temperature sensing means.

These and other aspects and advantages of the present invention are set forth in the following detailed description and claims, particularly when considered in conjunction with the accompanying drawing in which like parts bear like reference numerals.

The drawing is a schematic illustration, partly in cross-section, of one embodiment of the present invention.

Referring now to the drawing, the present flow monitoring device, shown generally at 10, involves a pipe portion 12, an inlet pipe 14 and an outlet pipe 16. Inlet pipe 14 is connected to pipe portion 12 with a conventional cross fitting 18; while outlet pipe 16 is connected to pipe portion 12 by means of conventional T fitting 20. Pipe portion 12 is surrounded by a first thermal insulation layer 22 which, in turn is itself surrounded by a second thermal insulation layer 24. In between first and second thermal insulation layers 22 and 24 is a resistance winding 26 which is connected, via line 28 to a controller 30.

Also located between first and second thermal insulation layers 22 and 24 is a first thermocouple housing 32 which includes an iron-constantan thermocouple. All of the thermocouples involved in device 10 shown in the drawing are iron-constantan, type J thermocouples. A second thermocouple housing 34, which also includes a thermocouple, extends through first and second thermal insulation layers 22 and 24, through two opposing legs of cross-fitting 18 into inlet pipe 14. The iron wires from the first and second thermocouples are joined together to form first joined wire 36. The first and second constantan wires 38 and 40 from the first and second thermocouples, respectively, are each connected to controller 30. In this configuration, first and second constantan wires 38 and 40 provide a signal to controller 30 which is indicative of the difference, if any, in the temperatures sensed by the first and second thermocouples.

It should be noted that when a thermocouple housing passes through one or more legs of cross-fitting 18 or T fitting 20, the fitting is suitably equipped, e.g., plugged, to prevent liquid escaping.

A third thermocouple housing 42, which includes a third thermocouple, extends through opposing legs of cross-fitting 18 into pipe portion 12. A fourth thermocouple housing 44, which includes a fourth thermocouple, extends through two legs of T crossing 20 into pipe portion 12. The iron wires from third and fourth thermocouples are joined together to form second joined wires 46. The third constantan wire 48 from the third thermocouple and the fourth constantan wire 50 from the fourth thermocouple are each connected to a milli-voltmeter 52 and to a chart recorder 54. Milli-voltmeter is connected to an alarm horn 55. In this configuration, third and fourth constantan wires 48 and 50 provide a signal to milli-voltmeter 52 and chart recorder 54 which is indicative of the difference in temperatures sensed by the third and fourth thermocouples.

An elective resistor 56, for example of 1,000 ohms, is placed within pipe portion 12. Electric resistor 56 is connected via wires 58 and 60 to a constant voltage regulator 62 which feeds a substantially constant electric potential, e.g., 24 volts A.C., to electric resistor 56.

As shown in the drawing, voltage regulator 62, milli-voltmeter 52 and controller 30 are each connected to power source (line voltage) 64, which is nominally 115 V.A.C.

The present device 10 should be calibrated for each individual liquid the flow rate of which is to be measured. This is so because device 10 functions based on the specific heat of the flowing liquid, and different liquids do have different specific heats. Calibration of device 10 is similar to the normal functioning of device 10 except that an independent means of measuring the flow rate of the liquid, e.g., such as by weighing the liquid over a period of time, is employed and these results are correlated with the intensity of the signal received by milli-voltmeter 52.

Device 10 functions as follows. A relatively constant flow of liquid is caused to pass from inlet pipe 14, through pipe portion 12 and into outlet pipe 16. Controller 30, milli-voltmeter 52 and voltage regulator 62 are all activated. At this point, electric resistor 56 gives off heat at a substantially constant rate, thereby warming the flowing liquid.

Controller 30 activates resistance winding 26 causing the area around pipe portion 12 to be heated. Such heating continues until the signal received by controller 30 from first and second constantan wires 38 and 40 indicates that there is no difference in the temperatures sensed by the first and second thermocouples. Controller 30 acts to periodically activate resistance winding 26 as such a temperature difference is indicated. In the embodiment illustrated in the drawing it is assumed that the incoming liquid is at a higher temperature than the ambient and would, therefore, tend to lose heat to the ambient. However, if the incoming liquid were cooler than the ambient, resistance winding 26 would be replaced by a cooling element activated to remove heat from the area outside of and adjacent to pipe portion 12 in response to an indicator of a difference in the temperatures sensed by the first and second thermocouples. In this manner the cooling element would aid in maintaining the area outside of and adjacent to pipe portion 12 at substantially the same temperature as the liquid in inlet pipe 14.

The voltage signal received by milli-voltmeter 52 and chart recorder 54 from third and fourth constantan wires 48 and 50 is indicative of the flow rate of the liquid through pipe portion 12. Milli-voltmeter 52 provides a present measure of this flow rate whereas chart recorder 54 acts to provide a relatively permanent record of this flow rate over time. Milli-voltmeter 52 also acts to activate alarm horn 55 in the event that the signal received by milli-voltmeter 55 indicates a flow rate outside, either too high or too low, of the normal operating range set. The sounding of alarm horn 55 is a signal that the liquid flow rate is outside normal limits and that human attention is needed.

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. An apparatus adapted to monitor the flow rate of a liquid comprising:
   (a) conduit means through which said liquid is caused to flow, said conduit means having a liquid inlet through which said liquid enters said conduit means and a liquid outlet through which said liquid exits said conduit means;
   (b) heating means associated with said conduit means and adapted to supply heat at a substantially constant rate to said liquid in said conduit means;
   (c) temperature control means associated with said conduit means and comprising first temperature sensing means adapted to sense the temperature of said liquid entering said conduit means; second temperature sensing means adapted to sense the temperature of the area outside and adjacent to said conduit means; temperature maintenance means located in spaced relation to said area outside of and adjacent to said conduit means; and controller means associated with said first and second temperature sensing means and said temperature maintenance means and adapted to increase or decrease the amount of heat supplied to said temperature maintenance means in response to the difference in temperatures sensed by said first and second temperature sensing means, thereby maintaining said area outside of and adjacent to said conduit means at substantially the same temperature as said liquid entering said conduit means;
   (d) upstream temperature sensing means associated with said conduit means and adapted to sense the temperature of said liquid in said conduit means at a point prior to said heat being supplied to said liquid; and
   (e) downstream temperature sensing means associated with said conduit means and adapted to sense the temperature of said liquid in said conduit means at a point after said heat has been supplied to said liquid, whereby the difference in temperatures sensed by said upstream and downstream temperature sensing means is proportional to the flow rate of said liquid in said conduit means.

2. The apparatus of claim 1 which further comprises first differential temperature indicator means associated with said upstream and downstream temperature sensing means and adapted to provide a visual representation of the difference in the temperatures sensed by the upstream and downstream temperature sensing means.

3. The apparatus of claim 1 which further comprises recorder means associated with said upstream and said downstream temperature sensing means adapted to record the difference in the temperatures sensed by said upstream and downstream temperature sensing means.

4. The apparatus of claim 1 wherein said heating means includes an electric resistor element connected to a constant voltage means adapted to provide a substantially constant electric potential across said resistor element.

5. The apparatus of claim 4 wherein said electric resistor element has a substantially constant electric resistance in the range of about 20 ohms to about 5,000 ohms.

6. The apparatus of claim 1 wherein both said upstream and downstream temperature sensing means include a thermocouple.

7. The apparatus of claim 1 wherein said flowrate is in the range of about 30 grams per hour to about 600 grams per hour.

8. The apparatus of claim 1 wherein said first and second temperature sensing means each include a thermocouple.

9. The apparatus of claim 1 wherein said temperature control means further comprises a second differential temperature indicator means associated with both said first and second temperature sensing means and adapted to provide a visual representation of the difference in temperatures sensed by said first and second temperature sensing means.

* * * * *